(12) United States Patent
Parkinson

(10) Patent No.: US 9,798,326 B2
(45) Date of Patent: Oct. 24, 2017

(54) VESSEL POSITIONING SYSTEM

(71) Applicant: Mojo Maritime Limited, Falmouth (GB)

(72) Inventor: Richard Parkinson, Falmouth (GB)

(*) Notice: Subject to any disclaimer, the term of this patent is extended or adjusted under 35 U.S.C. 154(b) by 78 days.

(21) Appl. No.: 14/424,521

(22) PCT Filed: Aug. 29, 2013

(86) PCT No.: PCT/GB2013/052263
§ 371 (c)(1),
(2) Date: May 12, 2015

(87) PCT Pub. No.: WO2014/033457
PCT Pub. Date: Mar. 6, 2014

(65) Prior Publication Data
US 2016/0252907 A1   Sep. 1, 2016

(30) Foreign Application Priority Data

Aug. 30, 2012 (GB) .................................. 1215481.1

(51) Int. Cl.
| | |
|---|---|
| G05D 1/02 | (2006.01) |
| G05D 1/08 | (2006.01) |
| B63H 25/04 | (2006.01) |
| B63H 25/42 | (2006.01) |

(52) U.S. Cl.
CPC .......... *G05D 1/0206* (2013.01); *B63H 25/04* (2013.01); *B63H 25/42* (2013.01); *G05D 1/0208* (2013.01); *G05D 1/0875* (2013.01); *B63H 2025/045* (2013.01); *B63H 2025/425* (2013.01); *G05D 1/027* (2013.01)

(58) Field of Classification Search
CPC ...... B63H 25/04; B63H 25/42; G05D 1/0206; G05D 1/0208; G05D 1/0875
See application file for complete search history.

(56) References Cited

U.S. PATENT DOCUMENTS

| | | | | |
|---|---|---|---|---|
| 6,477,465 B1* | 11/2002 | McCall | ................. | G01C 21/16 701/501 |
| 8,301,318 B2* | 10/2012 | Lacaze | ................. | G05D 1/0206 701/2 |
| 8,989,948 B2* | 3/2015 | Huntsberger | ........ | G05D 1/0206 701/21 |
| 2006/0064211 A1* | 3/2006 | Johansen | ............. | G05D 1/0206 701/21 |

(Continued)

*Primary Examiner* — Dale W Hilgendorf
(74) *Attorney, Agent, or Firm* — The Weintraub Group, P.L.C.

(57) ABSTRACT

An aquatic vessel comprising a control system for controlling the position of the vessel, the control system including one or more inputs for receiving real-time operational data in relation to flow conditions of the aquatic environment. The vessel has a dynamic positioning system and a navigational system connected to the dynamic positioning system, the navigational system comprising a data processing device and a plurality of motion sensors for continuously calculating the position, orientation and velocity of the vessel. Furthermore, a data processing device for generating data in relation to a plurality of possible failures of parts of the vessel is included, the data processing device being in communication with the control system which is thereby able to react in the event of an actual failure of a part of the vessel.

7 Claims, 1 Drawing Sheet

(56) References Cited

U.S. PATENT DOCUMENTS

Figure 1:
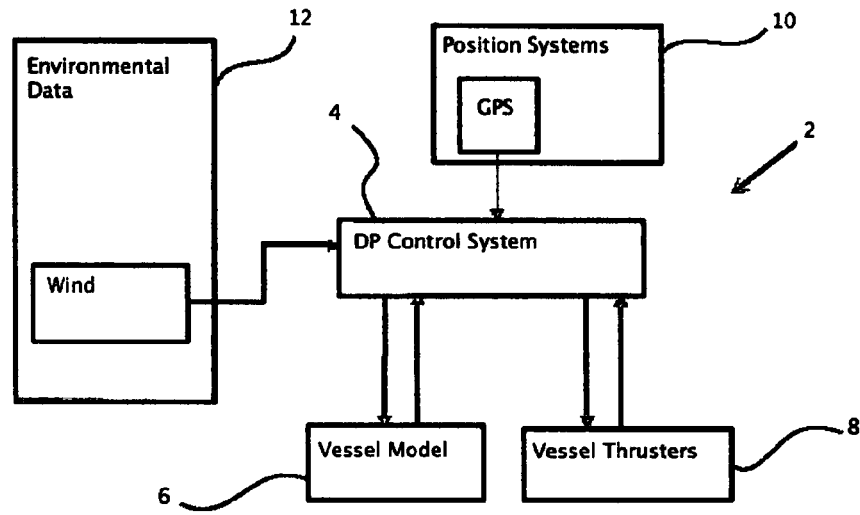

| | | | |
|---|---|---|---|
| 2009/0018774 A1* | 1/2009 | Winkler | G01C 21/00 702/2 |
| 2009/0043436 A1* | 2/2009 | Igarashi | B63H 25/04 701/21 |
| 2009/0187297 A1* | 7/2009 | Kish | G05B 23/0213 701/21 |
| 2010/0009578 A1* | 1/2010 | Daum | B63H 25/42 440/1 |
| 2010/0088030 A1* | 4/2010 | Stephens | B63H 25/04 701/500 |
| 2014/0114509 A1* | 4/2014 | Venables | G05D 1/0875 701/21 |

* cited by examiner

VESSEL POSITIONING SYSTEM

CROSS REFERENCE TO RELATED APPLICATION

This application is a national phase filing under 35 U.S.C. §371 based on International Application No. PCT/GB2013/052263, having an International filing date of Aug. 29, 2013 for an "APPARATUS AND METHOD", the disclosures of which are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention relates to a positioning system for a vessel.

Description of Related Art including information disclosed under 37 CFR 1.97 and 1.98

US2009/0043436A1 discloses an automatic vessel position holding control method for holding a vessel position and a vessel heading of a vessel on the ocean. This method reduces a positional deviation and a heading deviation sharply, as compared with the conventional automatic vessel position holding control, by performing feedforward control for estimating and then compensating at least one of a wave drifting force and a wave drifting moment that act on the vessel. A vessel position holding control is performed that includes such controls as estimating waves entering the vessel from the motion thereof, calculating at least one of the wave drifting force and the wave drifting moment from the estimated waves, and performing feedforward control for at least one of the calculated wave drifting force and the calculated wave drifting moment.

US2010/0088030A1 discloses an improved architecture for integrating an inertial navigation system (INS) into a dynamic positioning (DP) system for a vessel. The architecture includes an INS unit and a DP system having a Kalman filter or other algorithm for combining data supplied by a plurality of position measuring equipment (PME) and the INS unit to derive an estimate of the position or speed of the vessel.

US2009/0018774A1 discloses COTS devices integrated into a system employing custom software and custom hardware and software interfaces to collect and communicate data concerning current flows around a fixed structure (e.g., inland locks, bridges, harbor structures, etc.) in various bodies of water (e.g., inland waterways, harbors, canals, etc.). Embodiments comprise: sensors and communications equipment, for example, wireless systems that transmit sensor data to a lock house; lock house communications equipment that receives sensor data; a processor, e.g., a personal computer, with installed custom software and interface for processing data; an Automatic Identification System (AIS) transponder interfaced to the processor; an AIS installed in vessels to include an electronic vector chart display, such as may be installed in a towboat pilothouse; and an optional web-based database application for lock operators to record dam operation scenarios that may be used in research, investigations, and the like.

BRIEF SUMMARY OF THE INVENTION

According to a first aspect of the present invention there is provided a vessel having a dynamic positioning system and a navigational system connected to the dynamic positioning system, said navigational system comprising a data processing device and a plurality of motion sensors for continuously calculating the position, orientation and velocity of the vessel.

According to a second aspect of the invention, there is provided a method of maintaining a desired position of a vessel, comprising sensing position, orientation and velocity of the vessel, continuously generating data in relation to the position, orientation and velocity, and readily providing a reaction force to maintain the desired vessel position.

Owing to these aspects, it is possible to relatively readily and rapidly react to changes from the desired position.

According to a third aspect of the present invention, there is provided an aquatic vessel comprising a control system for controlling the position of the vessel, said control system including one or more inputs for receiving real-time operational data in relation to flow conditions of the aquatic environment.

According to a fourth aspect of the present invention there is provided a method of positioning a vessel in an aquatic environment comprising controlling by way of a control system the position of the vessel, receiving real-time operational data in relation to flow conditions of the aquatic environment into the control system, and reacting to changes in the flow conditions in accordance with the operational data.

Owing to these two aspects, live data in relation to flow of water in a marine environment can be input into the control system in order to accurately position the vessel at a desired location.

According to a fifth aspect of the invention, there is provided an aquatic vessel comprising a control system for controlling the position of the vessel, a data processing device for generating data in relation to a plurality of possible failures of parts of the vessel, the data processing device being in communication with the control system which is thereby able to react in the event of an actual failure of a part of the vessel.

According to a sixth aspect of the present invention, there is provided a method of controlling an aquatic vessel comprising generating data in relation to a plurality of possible failures of parts of the vessel, communicating the data with a control system of the vessel, the control system reacting in the event of an actual failure of a part of the vessel.

Owing to these aspects, predictions of possible failures can be made to readily react if an actual failure occurs which has previously been predicted.

In order that the present invention can be disclosed, reference will now be made, by way of example, to the accompanying drawings in which:

BRIEF DESCRIPTION OF THE SEVERAL VIEWS OF THE DRAWING(S)

Figure 2:
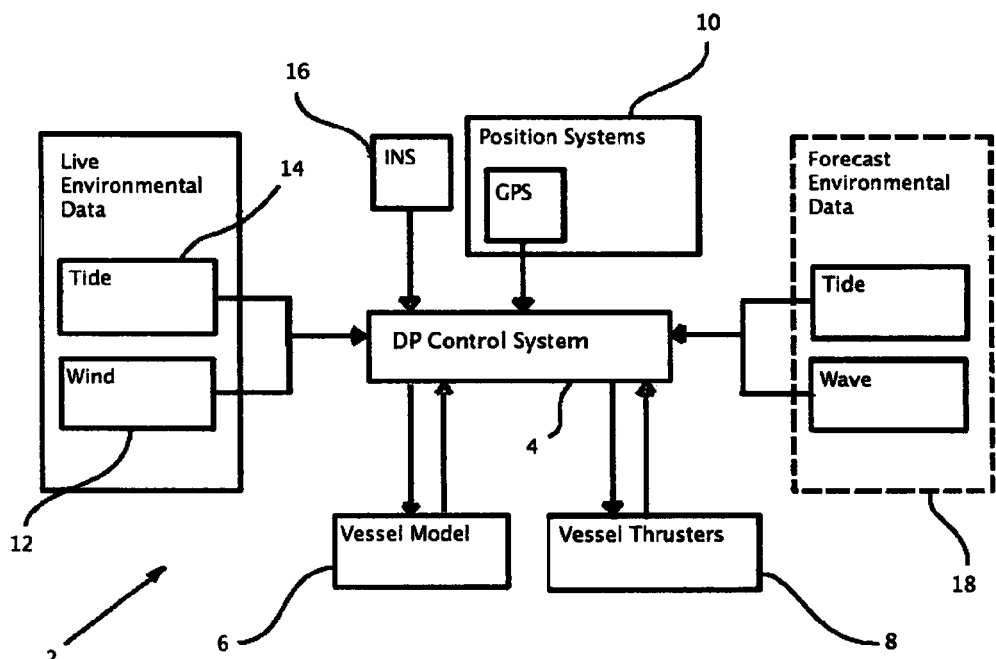

FIG. 1 shows a schematic representation of a known dynamic positioning system of a marine vessel, and FIG. 2 shows a schematic representation of an improved dynamic positioning system according to the present invention.

DETAILED DESCRIPTION OF THE INVENTION

Referring to FIG. 1, a dynamic positioning system 2 comprises a control system 4 having a plurality of inputs relating to vessel model 6, vessel thrusters 8 and from a global positioning system (GPS) 10. Environmental data is also received in relation to wind conditions 12 above the surface of the marine environment, i.e. a sea is also received into the control system 4.

An object of the invention is to improve the ability of a dynamically positioned vessel to maintain station in areas with flow in the form of tidal currents and/or waves.

Referring to FIG. 2, real-time, live tidal data 14 is able to be fed into the control system 4. Such data 14 is very important for the vessel in high-speed tidal currents. Current dynamic position (DP) systems, such as that of FIG. 1, do not include the data 14 as a real-time, live input. If such data is input into known systems, it has to be input by an operator manually (open to unacceptable delay of data entry and erroneous data entry) and the control system is setup to respond to gusts of wind and re-route thrust accordingly to maintain station. This is sufficient for a vessel working in little to no tide, however for vessels working in a tidal site, the largest force experienced by the vessel is the hydrodynamic force due to the current, so that a real-time, live input of the data 14 (tide speed and possibly direction) helps the DP control system 4 maintain the vessels position significantly more accurately.

An inertial navigation system 16 (INS) is also connectable to the control system 4. The INS comprises a data processing device and a plurality of motion sensors at the least and is sensitive to vessel accelerations and therefore speed and displacement in a 3-dimensional space, i.e. 6 degrees of freedom, namely roll, pitch, yaw, surge, heave and sway, at a relatively very high frequency. Owing to these measurements taking place at high frequency, small movements, even very small movements, can be recorded. When integrated into the DP control system 4, early identification of the movement is determined as compared to known the system of FIG. 1 and the like. Therefore, when used with the GPS 10 or other suitable positioning systems, which operate at a lower frequency, the INS 16 can accurately monitor the vessel movements. Thus, a reaction force can be provided significantly sooner by the DP control system 4 by way of, for example, the vessel thrusters so that the vessel's deviation from its desired location is minimised and corrected. As a result, the engines do not need to work as hard to bring the vessel back on station, thus improving operational efficiency and reducing fuel consumption.

A forecast of tide and wave data 18 is another provision of real-time, live data. Such forecast data 18 can be obtained from, for example, forward looking sensors, such as, but not limited to, horizontal acoustic Doppler current profile devices (ADCP's) mounted on the vessel or on one or more tide speed/heading monitoring devices not directly mounted on the vessel but positioned upstream of the vessel transmitting real-time, live data to the vessel's DP control system 4 to achieve the same affect. This would inform the DP control system 4 of such occurrences of, for example, tidal surge (or wave) magnitude and direction so that the control system 4 can take pro-active action to compensate and better maintain vessel position. The forecast data 18 may also include turbulence data, which can have an impact on thruster efficiency and therefore depending on the thruster performance at varying turbulence levels the predicted thrust required can be more accurately determined. This again would help to maintain the vessel position as less iterations of thrust increase would be required.

Yet a further set of data that could be input into the control system 4 is so-called "what-if failure models" running in parallel with the DP control system 4. In this way, a plurality of possible failure scenarios can be calculated so that in the event of an actual failure corresponding to one of the scenarios, such as a thruster failure, motor failure, sensor failure, etc., the most appropriate recovery action in terms of maintaining vessel position can be automatically implemented by way of the control system 4 with regard also to the real-time, live environmental conditions being measured. This failure modelling could coincide with the transmission of an alert signal or other suitable notification to the operator and/or deck crew depending on the marine operation being undertaken. From that point forward the DP operator or crew member can review the failure with relevant personnel on board the vessel so that the marine operations can be either continued if there is sufficient redundancy or the marine operation can be finished safely depending on the nature of the failure.

The dynamic positioning system of FIG. 2 enhances the position reference system of the vessel with a view to maximizing performance and efficiency with the ability to move from existing systems to a pro-active system. A vessel fitted with the system 2 of FIG. 2 has advantages when using the vessel for various marine operations, such as installation of offshore structures, sub-marine investigative operations, military operations such as mine-hunting and for sub-sea mining operations.

I claim:

1. An aquatic vessel comprising:
    (a) a control system for controlling a position of the vessel, said control system including one or more inputs for receiving real-time operational data in relation to flow conditions of an aquatic environment;
    (b) a dynamic positioning system and a navigational system connected to the dynamic positioning system, said navigational system comprising a data processing device and a plurality of motion sensors for continuously calculating the position, orientation, and velocity of the vessel; and
    wherein real-time, live tidal data is fed into the control system, the control system also receiving a forecast of tide and wave data, the forecast data being obtained from a plurality of forward-looking horizontal acoustic Doppler current profile devices mounted on the vessel and the forecast data is utilized to provide the vessel with a predicted reaction force to control the position of the vessel.

2. The aquatic vessel according to claim 1, wherein the one or more inputs further relate to vessel model, vessel thrusters, global positioning, and wind conditions above the surface of the aquatic environment.

3. The aquatic vessel according to claim 1, and further comprising one or more tide speed/heading monitoring devices, wherein the forward-looking sensors are mounted on the one or more tide speed/heading monitoring devices positioned upstream of the vessel and transmitting the real-time, live data to the control system.

4. The aquatic vessel according to claim 1, and further comprising a data processing device for generating data in relation to a plurality of possible failures of parts of the vessel, the data processing device being in communication with the control system which is thereby able to react in the event of an actual failure of a part of the vessel.

5. A method of positioning a vessel in an aquatic environment comprising:
   (a) providing a control system;
   (b) controlling a position of the vessel by utilizing the control system;
   (c) receiving real-time operational data in relation to flow conditions of the aquatic environment into the control system, and in relation to position, orientation, and velocity of the vessel;
   (d) continuously generating data in relation to the flow conditions, vessel position, vessel orientation, and vessel velocity;
   (e) the control system reacting to changes in the flow conditions, vessel position, vessel orientation, and vessel velocity in accordance with the operational data; and
   wherein real-time, live tidal data is fed into the control system, the control system also receiving a forecast of tide and wave data, the forecast data being obtained from a plurality of forward-looking horizontal acoustic Doppler current profile devices, and further wherein the forecast data is utilized to provide the vessel with a predicted reaction force to control the vessel position.

6. The method according to claim 5, wherein the receiving real-time operational data further comprises receiving data relating to vessel model, vessel thrusters, global positioning, and wind conditions above the surface of the aquatic environment.

7. The method according to claim 5, and further comprising:
   (a) generating data in relation to a plurality of possible failures of parts of the vessel;
   (b) communicating the data with the control system of the vessel; and
   wherein the control system reacts in the event of an actual failure of a part of the vessel.

* * * * *